US010721583B2

(12) United States Patent
Guo

(10) Patent No.: US 10,721,583 B2
(45) Date of Patent: Jul. 21, 2020

(54) ELECTRONIC APPARATUS, DEVICE AND METHOD FOR ADJUSTING A PARAMETER FOR A PROXIMITY-BASED SERVICE COMMUNICATION

(71) Applicant: Sony Corporation, Tokyo (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 16/067,336

(22) PCT Filed: Apr. 20, 2017

(86) PCT No.: PCT/CN2017/081206
§ 371 (c)(1),
(2) Date: Jun. 29, 2018

(87) PCT Pub. No.: WO2017/193784
PCT Pub. Date: Nov. 16, 2017

(65) Prior Publication Data
US 2018/0376281 A1 Dec. 27, 2018

(30) Foreign Application Priority Data

May 13, 2016 (CN) .......................... 2016 1 0319282

(51) Int. Cl.
*H04W 4/021* (2018.01)
*H04W 52/24* (2009.01)
(Continued)

(52) U.S. Cl.
CPC .......... *H04W 4/021* (2013.01); *H04W 4/029* (2018.02); *H04W 52/245* (2013.01);
(Continued)

(58) Field of Classification Search
None
See application file for complete search history.

(56) References Cited

U.S. PATENT DOCUMENTS 7,313,154 B2 12/2007 Day et al.
2004/0001452 A1 1/2004 Day et al.
(Continued)

FOREIGN PATENT DOCUMENTS

| CN | 101277146 A | 10/2008 |
|---|---|---|
| CN | 103595589 A | 2/2014 |

(Continued)

OTHER PUBLICATIONS

International Search Report dated Jul. 14, 2017 in PCT/CN2017/081206, filed Apr. 20, 2017.

(Continued)

*Primary Examiner* — German Viana Di Prisco
(74) *Attorney, Agent, or Firm* — Xsensus LLP

(57) ABSTRACT

An electronic apparatus, an information processing device and an information processing method. An electronic apparatus for a base station side includes a processing circuit. The processing circuit is configured to: control a user equipment to acquire, from a base station, reference information about a signal intensity on a specific spectrum resource in a predetermined region; when the user equipment is located in the predetermined region, control the user equipment to sense the signal intensity on the specific spectrum resource; and control the user equipment to adjust, based on the reference information and the sensed signal intensity, a parameter for performing near-distance service communication in the predetermined region, so as to achieve an expected communication performance, wherein the parameter influences the access rate and/or transmission reliability of near-distance service communication.

20 Claims, 12 Drawing Sheets

(51) Int. Cl.
*H04W 52/38* (2009.01)
*H04W 4/029* (2018.01)
*H04W 64/00* (2009.01)
*H04W 4/44* (2018.01)
*H04W 4/80* (2018.01)

(52) U.S. Cl.
CPC ....... *H04W 52/383* (2013.01); *H04W 64/003* (2013.01); *H04W 4/44* (2018.02); *H04W 4/80* (2018.02)

(56) References Cited

U.S. PATENT DOCUMENTS

| | | | |
|---|---|---|---|
| 2008/0095082 A1 | 4/2008 | Day et al. | |
| 2008/0270619 A1* | 10/2008 | Davies | H04L 63/08 709/229 |
| 2012/0314600 A1 | 12/2012 | Zeira | |
| 2014/0148142 A1 | 5/2014 | Hakola et al. | |
| 2014/0321314 A1* | 10/2014 | Fodor | H04W 72/085 370/252 |
| 2015/0119055 A1* | 4/2015 | Shin | H04W 8/005 455/450 |
| 2016/0037385 A1* | 2/2016 | Boudreau | H04W 76/14 370/328 |
| 2016/0037530 A1* | 2/2016 | Peng | H04W 76/14 370/329 |
| 2016/0057709 A1* | 2/2016 | Gao | H04W 52/243 455/452.2 |
| 2016/0183121 A1* | 6/2016 | Kazmi | H04W 28/18 370/230 |
| 2016/0183237 A1* | 6/2016 | Cai | H04W 72/048 370/329 |
| 2016/0330699 A1* | 11/2016 | Yang | H04W 52/241 |
| 2018/0206280 A1* | 7/2018 | Kasparick | H04B 17/309 |

FOREIGN PATENT DOCUMENTS

| | | |
|---|---|---|
| CN | 103857006 A | 6/2014 |
| WO | 2015/113444 A1 | 8/2015 |

OTHER PUBLICATIONS

Extended European Search Report dated Apr. 24, 2019 in European Application No, 17795402.1-1213.

\* cited by examiner

ELECTRONIC APPARATUS, DEVICE AND METHOD FOR ADJUSTING A PARAMETER FOR A PROXIMITY-BASED SERVICE COMMUNICATION

FIELD

The present disclosure generally relates to the field of wireless communications, and in particular to an electronic device, information processing apparatus and information processing method for user equipment side, as well as an electronic device, information processing apparatus and information processing method for base station side.

BACKGROUND

The proximity-based service (ProSe) communication in the cellular network, such as device-to-device (D2D) communication, generally refers to a service in which user data is transmitted directly between terminals and not relayed via a network during the transmission process. In particular, as a typical scenario of the internet of things application, the D2D communication may include vehicle-to-vehicle (V2V) communication, and the like.

Taking the V2V communication as an example, the V2V communication may be used, for example, for the driving security management of the inside of a vehicle system and between a vehicle and another vehicle in close proximity of the vehicle, to reduce the frequency of traffic accidents. Currently, by the V2V communication, vehicle-mounted communication apparatuses are connected to the network, and the vehicle-mounted communication apparatuses transmit and share information via the network, so that the vehicle driving security can be improved. The intelligent transportation system (ITS) workgroup of the european telecommunication standards institute (ETSI) and the IEEE 802.11p workgroup have proposed corresponding intelligent transportation technology standards. The LTE-A of the 3rd generation partnership project (3GPP) has also started doing research on vehicle-to-everything (V2X) projects supported by the long term evolution (LTE). The internet of vehicles is mainly intended to ensure that the vehicle driving state or accident warning information can be reliably and rapidly exchanged between vehicles, thereby ensuring the driving security and reducing the accident impact.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, an electronic device for user equipment side is provided. The electronic device includes a processing circuit. The processing circuit is configured to: control the user equipment to acquire from a base station, reference information of a signal intensity over a specific spectrum resource in a predetermined area; control the user equipment to sense the signal intensity over the specific spectrum resource in a case that the user equipment is located in the predetermined area; and control the user equipment to adjust, based on the reference information and the sensed signal intensity, a parameter for performing proximity-based service communication in the predetermined area, to achieve a desired communication performance. The parameter affects an admission rate and/or a transmission reliability of the proximity-based service communication.

According to another embodiment, an information processing apparatus for user equipment side is provided. The information processing apparatus includes a transceiving device and a processing circuit. The processing circuit is configured to: control the transceiving device to acquire from a base station, reference information of a signal intensity over a specific spectrum resource in a predetermined area; control the user equipment to sense the signal intensity over the specific spectrum resource in a case that the user equipment is located in the predetermined area; and control the user equipment to adjust, based on the reference information and the sensed signal intensity, a parameter for performing proximity-based service communication in the predetermined area, to achieve a desired communication performance. The parameter affects an admission rate and/or a transmission reliability of the proximity-based service communication.

According to another embodiment, an information processing method for user equipment side is provided. The information processing method includes: acquiring, from a base station, reference information of a signal intensity over a specific spectrum resource in a predetermined area; sensing the signal intensity over the specific spectrum resource in a case that the user equipment is located in the predetermined area; and adjusting, based on the reference information and the sensed signal intensity, a parameter for performing proximity-based service communication in the predetermined area, to achieve a desired communication performance. The parameter affects an admission rate and/or a transmission reliability of the proximity-based service communication.

According to another embodiment, an electronic device for base station side is provided. The electronic device includes a processing circuit. The processing circuit is configured to: control the base station to acquire movement information (including a position, a movement direction, a movement speed, or a target movement route) of a target user equipment; and control the base station to transmit to the target user equipment, reference information of a signal intensity over a specific spectrum resource in a predetermined area and/or a reference value of a parameter for performing proximity-based service communication, if it is determined based on the movement information that the target user equipment is about to enter the predetermined area.

According to another embodiment, an information processing apparatus for base station side is provided. The information processing apparatus includes a transceiving device and a processing circuit. The processing circuit is configured to: control the base station to acquire movement information of a target user equipment; and control the transceiving device to transmit to the target user equipment, reference information of a signal intensity over a specific spectrum resource in a predetermined area and/or a reference value of a parameter for performing proximity-based service communication, if it is determined based on the movement information that the target user equipment is about to enter the predetermined area.

According to another embodiment, an information processing method for base station side is provided. The information processing method includes: acquiring movement information of a target user equipment; and transmitting, to the target user equipment, reference information of a signal intensity over a specific spectrum resource in a predetermined area and/or a reference value of a parameter for performing proximity-based service communication, if it is determined based on the movement information that the target user equipment is about to enter the predetermined area.

With the embodiments of the present disclosure, even in an area that is not covered by a network infrastructure signal, the user equipment can autonomously perform the parameter adjusting to improve the admission rate and/or transmission reliability of the target service.

BRIEF DESCRIPTION OF THE DRAWINGS

The present disclosure can be understood better with reference to the description given in conjunction with the drawings in the following. The same or similar element is indicated by the same or similar reference numeral throughput all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF EMBODIMENTS

Figure 1:
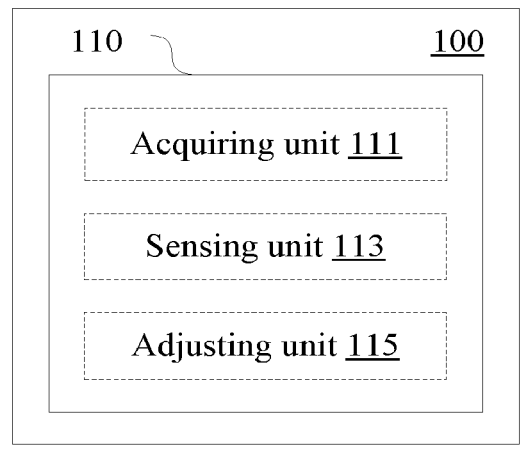
FIG. 1 is a block diagram showing a configuration example of an electronic device for user equipment side according to an embodiment of the present disclosure.

Embodiments of the present disclosure are described below with reference to the drawings. Elements and features described in one drawing or one embodiment of the present disclosure may be combined with elements and features illustrated in one or more other drawings or embodiments. It should be noted that, for clarity, indication and description of components and processing irrelevant to the present disclosure and known by those skilled in the art are omitted in the drawings and the illustration.

As shown in FIG. 1, an electronic device 100 for user equipment side according to an embodiment includes a processing circuit 110. The processing circuit 110 may be implemented as, for example, a specific chip, a chipset, a central processing unit (CPU).

The processing circuit 110 includes an acquiring unit 111, a sensing unit 113 and an adjusting unit 115. It should be noted that, although the acquiring unit 111, the sensing unit 113 and the adjusting unit 115 are shown as functional blocks in FIG. 1, it should be understood that functions of the acquiring unit 111, the sensing unit 113 and the adjusting unit 115 may be implemented by the processing circuit 110 as a whole and are not necessarily implemented by actual discrete components in the processing circuit 110. In addition, although the processing circuit 110 is shown by one block in FIG. 1, the electronic device 100 may include multiple processing circuits, and the functions of the acquiring unit 111, the sensing unit 113 and the adjusting unit 115 may be distributed to the multiple processing circuits so that the multiple processing circuits operate in coordination to implement the functions.

The acquiring unit 111 is configured to control the user equipment to acquire reference information of a signal intensity over a specific spectrum resource in a predetermined area from a base station.

The predetermined area may be, for example, an area not covered by a communication network to which the user equipment belongs, so that the user equipment can autonomously perform related operations as described below based on the acquired reference information in the case of being not covered by the network. However, the present disclosure is not limited thereto. The above-described predetermined area may be set according to specific applications, and the predetermined area may include an area covered by the network. In other words, the user equipment may also autonomously perform the related operations based on the acquired reference information in the case of being covered by the network.

The specific spectrum resource may include, for example, a spectrum resource assigned to vehicles communication (corresponding to a case that the user equipment is a vehicle) or a spectrum resource over an unlicensed frequency band.

The signal intensity over the specific spectrum resource may reflect a density or the number of other user equipments operating over the specific spectrum resource. In a case that the current user equipment performs proximity-based service communication by using the specific spectrum resource in a target area, the other user equipments serve as interference sources of the proximity-based service communication. The reference information may reflect or include a predetermined correspondence between a reference value of a parameter and the signal intensity over the specific spectrum resource to meet a predetermined admission rate and/or transmission reliability of the proximity-based service communication over the specific spectrum resource. The reference information may include, for example, a maximum signal intensity that is tolerable by the user equipment in a case that the user equipment operates with a current reference value of the parameter and the predetermined admission rate and/or transmission reliability of the proximity-based service communication over the specific spectrum resource is met.

The proximity-based service communication may include, for example, machine type communication (MTC), device-to-device (D2D) communication, vehicle-to-everything (V2X) communication, and internet of things (IOT) communication. The V2X communication may include vehicle-to-vehicle (V2V) communication, vehicle-to-pedestrian (V2P) communication, vehicle-to-infrastructure (V2I) communication, and the like.

The reference information may be held and maintained by the base station. The base station may acquire the reference information in various ways. For example, the base station may estimate the reference information in the predetermined area based on historical data (e.g., the number of user equipments, the distribution of the user equipments, the usage of spectrum resources, and the signal intensity) of the entire network. Alternatively, the base station may acquire a position and movement information of the user equipment that the base station serves to obtain the number of vehicles entering in the predetermined area, and then estimates the reference information by using a normal service model. Alternatively, the user equipments may respectively store measurement results in the target area by themselves, and report the measurement results to base stations in the case of being covered by a signal, and the measurement results may be shared among the base stations, so that the base station at the edge of the predetermined area can determine the reference information based on the measurement results.

The sensing unit 113 is configured to control the user equipment to sense the signal intensity over the specific spectrum resource in a case that the user equipment is located in the predetermined area.

As described above, the reference information acquired from the base station under control of the acquiring unit 111 is, for example, an estimated value of the signal intensity in the predetermined area that is obtained based on the historical data or statistical data, and the signal intensity sensed under control of the sensing unit 113 corresponds to an actual measured value. The sensing unit 113 controls, for example, the user equipment to perform signal sensing by using energy sensing or feature detection.

The adjusting unit 115 is configured to control the user equipment to adjust a parameter for performing proximity-based service communication in the predetermined area based on the acquired reference information and the sensed signal intensity, to achieve a desired communication performance. The parameter affects an admission rate and/or a transmission reliability of the proximity-based service communication.

The parameter for performing the proximity-based service communication in the predetermined area may include, for example, one or more of a clear channel assessment (CCA) threshold for accessing the specific spectrum resource, a frequency and/or the number of times of transmitting messages by using the proximity-based service communication, and a signal transmission power of the proximity-based service communication.

The CCA threshold and the frequency/the number of times of transmitting the message may affect the admission rate of the proximity-based service communication, and the signal transmission power may affect the transmission reliability of the proximity-based service communication. More specifically, in a case that an interference intensity is constant, a high CCA threshold or a high frequency of transmitting the message corresponds to a high admission probability of the user equipment for the proximity-based service communication. Similarly, in the case that the interference intensity is constant, a strong signal transmission power corresponds to a high transmission reliability of the proximity-based service communication.

In addition, the reference information may include a maximum signal intensity that is tolerable by the user equipment in a case that the predetermined admission rate and/or transmission reliability of the proximity-based service communication over the specific spectrum resource is met by using a current parameter (for example, a default parameter set by the user equipment or a reference parameter notified from the base station).

For the case of notifying the reference parameter from the base station, in an implementation, the processing circuit 110 may be further configured to control the user equipment to acquire a reference value of the parameter from the base station. The reference value of the parameter is determined, for example, by the base station side based on a reference signal intensity in the predetermined area and a target admission rate and/or transmission reliability of the proximity-based service communication. That is, in a case that the signal intensity (interference intensity) in the predetermined area is the reference signal intensity and the user equipment operates with the reference parameter, the target admission rate and/or transmission reliability can be met.

The adjusting unit 115 may be configured to adjust the parameter with an offset obtained based on the reference information and the sensed signal intensity. As described above, the reference information acquired by the acquiring unit 111 corresponds to the estimated value of the signal intensity (a potential interference level) in the predetermined area, and the sensing unit 113 senses an actual signal intensity. Therefore, the parameter may be offset based on a difference between the sensed signal intensity and the reference information, so that the target admission rate and/or transmission reliability can still be met at an actual interference level.

In addition, target admission rates/transmission reliabilities for different resource pools of the proximity-based service communication may be different, or relationships between the admission rates/transmission reliabilities and interference intensities may be different. Accordingly, the reference value of the parameter may be set individually for different resource pools.

In addition, an adjusting range for the parameter may be limited. In an implementation, the adjusting unit 115 is configured to adjust the parameter in a predetermined range. A case that the CCA threshold serves as the parameter is taken as an example. For example, an upper limit and a lower limit of the CCA threshold may be set. For example, in a case that the upper limit of the CCA threshold is reached, the CCA threshold is not further increased even if the target admission rate is not met.

For example, in a case that multiple systems or operators coexist, the adjusting range for the parameter may be agreed to avoid a case that the CCA threshold is excessively increased in order to achieve respective target admission rates, or a case that the signal transmission power is excessively increased in order to achieve respective transmission reliabilities.

In addition, the proximity-based service can include portions of different service priorities. Taking the V2X communication as an example, the communication related to security may have a high priority, the communication for a traffic jam message may have a medium priority, and the communication for an advertisement message may have a low priority.

In an implementation, the adjusting unit 115 may be configured to adjust the parameter based on a service priority of the proximity-based service communication, such that the admission rate and/or transmission reliability of a high priority service reaches a predetermined level. In other words, the admission rate and/or transmission reliability of the high priority service is preferentially ensured.

In addition, in an implementation, the sensing unit 113 and the adjusting unit 115 may perform the sensing and adjusting operations periodically or only in a case that a predetermined triggering condition is met. For example, the sensing and adjusting operations may be triggered in a case that no spectrum resource for the proximity-based service communication is found in a preset time period.

Next, an example embodiment is described with reference to FIG. 13. In the example, the user equipment is a vehicle, the proximity-based service communication is V2X communication, and the parameter is a CCA threshold. It should be understood that some aspects of the example may also be applied in other application scenarios.

Figure 13:
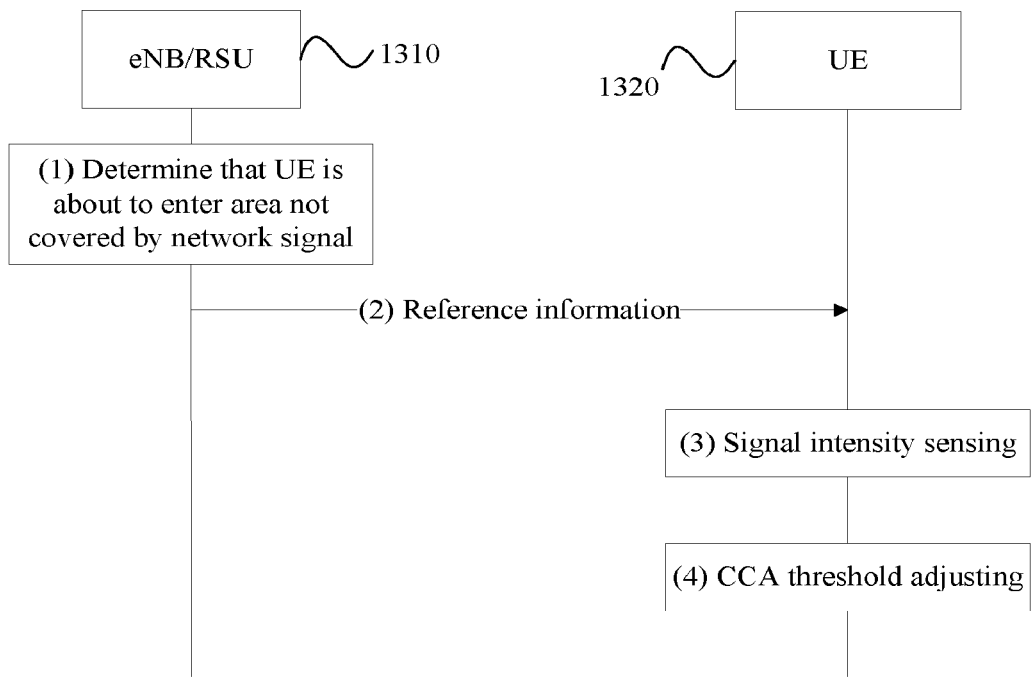
FIG. 13 is a schematic diagram illustrating an example process performed between a base station and a user equipment according to an embodiment.

FIG. 13 shows a schematic diagram of an information interaction process between a base station (eNB) or a roadside device (RSU) 1310 and a user equipment (UE) 1320.

In a process (1), the eNB/RSU 1310 determines based on movement characteristics (e.g., a vehicle speed and a direction) of the UE 1320 (which is also referred to as a "target node" hereinafter) that the UE 1320 is about to go beyond a signal coverage range of the eNB/RSU 1310 and enter an area (which is also referred to as a "target area" hereinafter) not covered by a network signal.

In a process (2), the eNB/RSU 1310 transmits reference information of a signal intensity in the target area which the UE 1320 is about to enter, to the UE 1320. In this example, a density of user equipments in the target area reflects an interference signal intensity in the target area. Accordingly, the reference information may include an interference signal I received from a reference interference source by the target node, or transmitting information of the reference interference source and a channel model, as well as other information for CCA threshold adjusting, such as a threshold of a reference CCA, a density of corresponding network nodes, and an adjusting offset for the reference CCA.

In a process (3), the V2X UE 1320 performs density estimating in the target area based on signal measurements. The operation may be triggered periodically or in a case that no available resource is found in a preset time threshold.

In addition, in the process (3), the UE 1320 may select a resource pool corresponding to a service, for example, select from preset available resource pools, and perform a sensing operation on the selected resource pool.

For example, a resource pool may be selected in the following way. With a wide bandwidth under the same conditions, transmission rate can be increased to reduce message transmission delay, and thus message collision probability can be reduced. The resource pools may be ranked in the descending order of a unit resource bandwidth to form a ring sequence starting from a resource pool with the widest unit bandwidth, and a resource pool may be selected for each service based on the ring sequence. In the resource pool selection process, the following features may be considered individually or in combination.

(i) A priority of a service X may be considered, which is indicated by Rank(X) and is generally characterized as a probability of obtaining a resource and a requirement on the transmission delay. A high priority corresponds to a high probability of obtaining an available channel and requires a short message transmission delay. Accordingly, a resource pool with a wide unit resource bandwidth is initially selected for a service with a high priority, and a resource pool with a narrow unit resource bandwidth is initially selected for a service with a low priority.

(ii) A message length may be considered. A resource pool with a wide unit resource bandwidth is initially selected for a service with a long message length, and a resource pool with a narrow unit resource bandwidth is initially selected for a service with a short message length.

(iii) A requirement for information reception may be considered. An apparatus is generally equipped with only one set of transceiving devices, resulting in only a half-duplex characteristic, i.e., information reception and transmission cannot be performed simultaneously. In a case that information transmitted by another UE arrives when the target UE is performing transmitting, the information cannot be received due to the half-duplex characteristic. A solution to the problem is to increase a bandwidth of the transmitting resource and reduce the required time. Accordingly, if the user equipment highly needs to receive messages from other network nodes, a resource pool with a narrow unit resource bandwidth is initially selected.

After a resource pool is selected, the UE performs signal sensing on resources in the resource pool. It is assumed that a sensed signal intensity of a target channel is $E_{agg}$, and a clear channel assessment threshold is $CCA_{Th}$. In the case of $E_{agg} < CCA_{Th}$, the channel is considered as a clear channel and may be directly used. In the case that no available resource is found in the preset time threshold, it is indicated that the interference is enhanced, and the clear channel assessment threshold $CCA_{Th}$ may be reset. In this case, a sensed result for another channel may be selected to perform the resetting. A channel with a minimum signal intensity or a medium signal intensity may be selected, or a channel may also be randomly selected, as a target channel.

It is assumed that the sensed signal intensity of the target channel is $E_{agg}$, and a target node provided by the network receives an interference signal I from a reference interference source. In this case, a density of the interference sources is estimated as $$n = \frac{E_{agg} - N}{I},$$

where N represents environment noise. Alternatively, the network may provide information of the reference interference source and a channel model, where a transmission power is $p_i$, a channel coefficient is $h_i$, a distance to the target node is d, and a path loss index is α. In this case, an aggregation interference signal received by the target node is expressed as $E_{agg}(n)=n*p_ih_id^{-\alpha}+N$ and the n may be calculated. ρ(n) indicates a density of nodes using the resource in the network.

Next, in a process (4), the UE 1320 performs CCA threshold adjusting.

It is assumed that the clear channel assessment threshold corresponding to the density ρ(n) is $CCA_{Th}(\rho(n))$, an admission probability of the node for the corresponding spectrum resource is calculated as $P_{adm}=Pr(E_{agg}(n)<CCA_{Th}(\rho(n)))$. The $E_{agg}(n)$ increases with the n. That is, for a certain area, in a case that an average service arrival rate of the users is constant, the aggregation interference increases as the number of users increases, resulting in a decreased admission probability in a case that the CCA threshold is constant. In order to maintain the admission probability of a specific service or service type constant, the CCA threshold is accordingly adjusted for different services.

Taking the case of increasing an admission rate of a high-priority service and reducing an admission rate of a low-priority service as an example, an adjusting strategy (the adjusting strategy may be notified by the eNB to UEs in advance, and the UEs adopt the unified adjusting strategy) may be performed, for example, in the following manners.

In a first manner, the CCA threshold is increased for the high-priority service, and the CCA threshold remains constant for the low-priority service. In this manner, the CCA threshold can be more flexibly adjusted for the high-priority service as needed, however, a density estimating operation and other operations are required to be performed in the adjusting process, which increases the calculation consumption.

In a second manner, the CCA threshold is decreased for the low-priority service, and the CCA threshold remains constant for the high-priority service. In this manner, operations for measuring and decreasing the CCA threshold are performed by the UE that performs the low-priority service, the UE that performs the high-priority service do not need to perform the density estimating operation and other operations, thereby reducing the calculation consumption and access delay; however, the admission rate of the high-priority service increases only in a case that the aggregation interference decreases due to adjusting the CCA threshold for the low-priority service.

In a third manner, the CCA threshold is increased for the high-priority service, and the CCA threshold is decreased for the low-priority service.

In a fourth manner, the CCA threshold is increased for both the high-priority service and the low-priority service, and the CCA threshold is increased more rapidly for the high-priority service than the low-priority service.

In a fifth manner, the CCA threshold is decreased for both the high-priority service and the low-priority service, and the CCA threshold is decreased more rapidly for the low-priority service than the high-priority service.

A specific adjusting process may be performed as follows. A adjusting offset $CCA_{bias}$ corresponding to a unit density change is preset. Taking the case of increasing the CCA threshold as an example, it is assumed that, a reference CCA threshold is $CCA_{Th}$, a reference density corresponding to the reference CCA threshold is $\rho_{Th}$, and a CCA threshold corresponding to the density ρ(n) is $$CCA_{Th}(\rho(n)) = CCA_{Th} + \frac{\rho(n)}{\rho_{Th}} CCA_{bias}.$$

In addition, different adjusting offsets may be set for services with different priorities. That is, $CCA_{bias}(Rank(X))$ is a function of a service type Rank(X), and varies according to different service types.

It should be noted that, for a certain area, in a case that a density of the users is constant, the average interference increases as the average service arrival rate of the users increases, resulting in a decreased admission probability in a case that the CCA threshold is constant. The situation may be equivalent to a situation in which the density of the users increases while the average service arrival rate is constant.

Next, another example embodiment is described with reference to FIG. 14. In the example, the user equipment is a vehicle, the proximity-based service communication is V2X communication, and the parameter is a frequency and/or the number of times of transmitting messages by using the proximity-based service communication. It should be understood that some aspects of the example may also be applied in other application scenarios.

Figure 14:
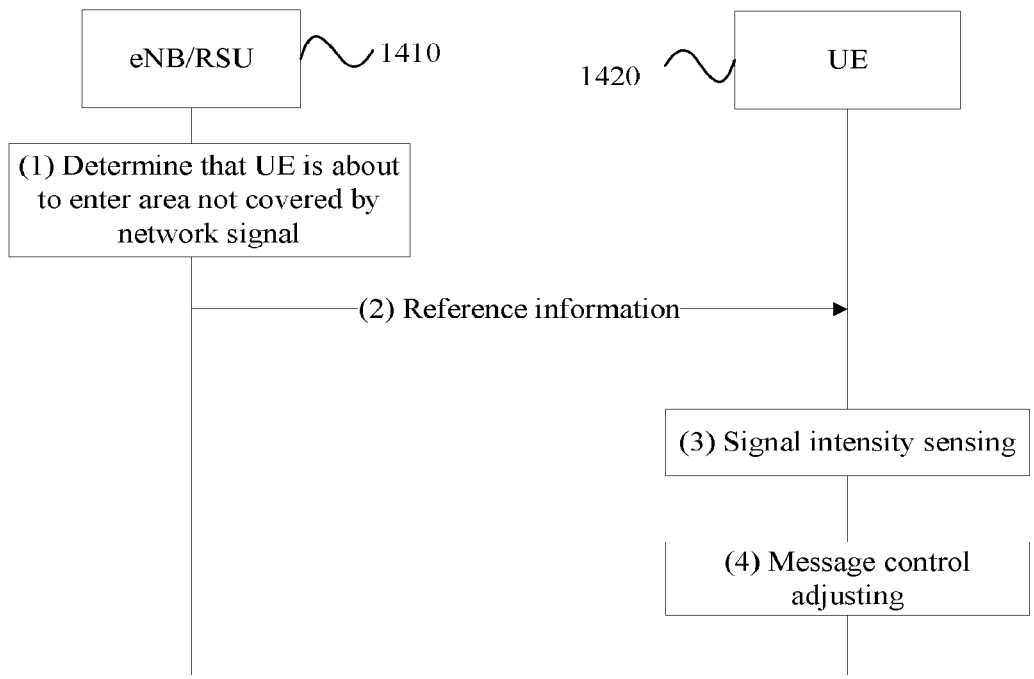
FIG. 14 is a schematic diagram illustrating an example process performed between a base station and a user equipment according to an embodiment.

As shown in FIG. 14, in a process (1), an eNB/RSU 1410 determines that a UE 1420 is about to enter a target area.

In a process (2), the eNB/RSU 1410 transmits to the UE 1420, reference interference source information for density estimating in the target area which the UE 1420 is about to enter, and reference information required for message control adjusting. In the example, the reference information includes a reference frequency and the reference number of times of transmitting messages, a density of corresponding network nodes, and reference adjusting offsets for the frequency and the number of times of transmitting messages.

In a process (3), the UE 1420 performs density estimating in the area not covered by the network based on signal measurements. The detailed process may refer to the process (3) described above with reference to FIG. 13.

In a process (4), the UE 1420 performs message control adjusting. Specifically, the frequency and the number of times of transmitting service messages are adjusted to increase an admission rate of a target service. The frequency of transmitting messages refers to the number of times of transmitting messages per unit time, including the frequency for the same message and the frequency for different messages. In addition, the number of times of transmitting the same message may be limited. By increasing the frequency and the number of times of transmitting messages, a resource occupancy rate of the service can be increased. By reducing the frequency and the number of times of transmitting messages, the resource occupation rate of the service can be decreased, thereby increasing the admission rate of other services for the same resource. In a case that the estimated density increases, in order to maintain the admission probability of a specific service or service type constant, the frequency and the number of times of transmitting messages is accordingly adjusted for different services. The specific adjusting strategy and manner may refer to the process (4) described above with reference to FIG. 13.

Next, another example embodiment is described with reference to FIG. 15. In the example, the user equipment is a vehicle, the proximity-based service communication is V2X communication, and the parameter is a signal transmission power. It should be understood that some aspects of the example may also be applied in other application scenarios.

Figure 15:
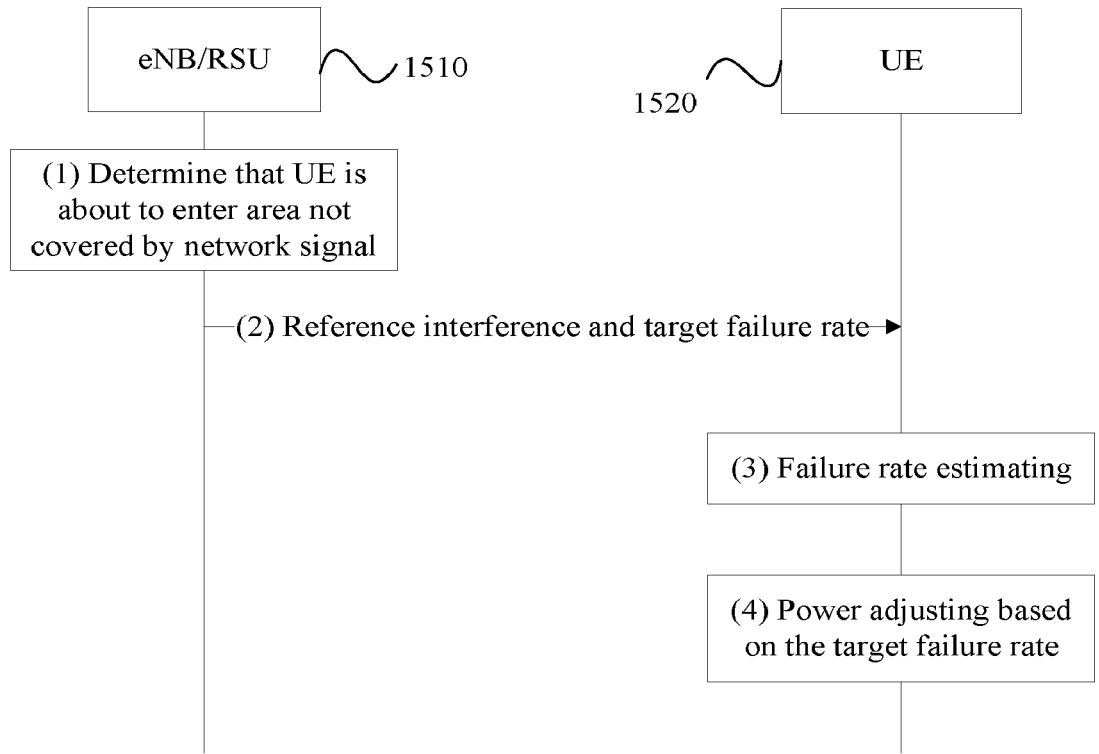
FIG. 15 is a schematic diagram illustrating an example process performed between a base station and a user equipment according to an embodiment.

As shown in FIG. 15, in a process (1), an eNB/RSU 1510 determines that a UE 1520 is about to enter a target area.

In a process (2), the eNB/RSU 1510 transmits reference interference source information for failure rate estimating and a target failure rate to the UE 1520.

In a process (3), the UE 1520 performs failure rate estimating in the area not covered by the network based on signal measurements. The operation may be triggered in a timer triggering manner or in a case that the interference signal measurement result changes. The failure rate estimating is performed based on density estimating to acquire $n*p_i h_i d_i^{-\alpha}$ in a signal-to-interference and noise ratio SINR (Nd), or only the energy estimating is performed to acquire $E_{agg}(n)$, which may be expressed as a sum of the interference and the noise, i.e., $E_{agg}(n)=n*p_i h_i d_i^{-\alpha}+N$.

Figure 16:
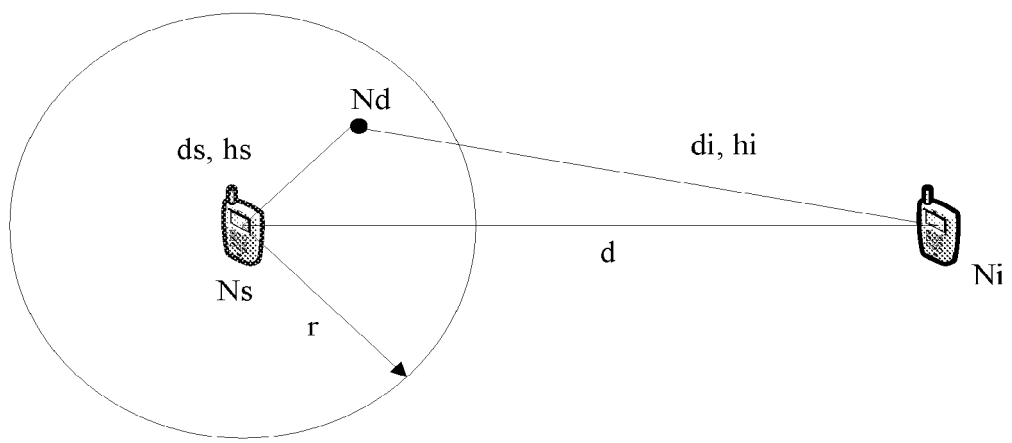
FIG. 16 is a schematic diagram illustrating a failure rate estimating process.

As shown in FIG. 16, it is assumed that, a signal source is Ns, a transmission power of the Ns is $p_s$, a channel coefficient for the Ns is $h_s$, a distance from a reference point Ni to the Ns is d, a transmission power of the reference point Ni is $p_i$, and a channel coefficient for the Ni is $h_i$, and an effective signal range corresponding to the Ns service is A with the Ns as a center and r as a radius. In a case that a point in the A is denoted as Nd, a signal-to-interference and noise ratio of the Nd may be expressed as $$SINR(Nd) = \frac{p_s h_s d_s^{-\alpha}}{n * p_i h_i d_i^{-\alpha} + N}.$$

It is assumed that a signal-to-interference and noise ratio threshold of a correct demodulated signal is $SINR_{Th}$, the failure rate in the effective range of the Ns service is estimated as $P_{fail}=Pr(SINR(Nd)<SINR_{Th}|Ns \in A)$. The $P_{fail}$ may indicate a ratio of the number of users who cannot correctly receive the Ns signal to the number of the total users in the range, where the users uniformly distributed in the given range A.

In a process (4), the required power is calculated based on the target failure rate. Specifically, it is assumed that for a service X, a failure rate required for the service type Rank(X) is Pf(Rank(X)). In a case that a target transmission power is expressed as $p_s=\min\{p_s|P_{fail}\leq Pf(Rank(X))\}$, which indicates a minimum transmission power meeting the target failure rate, the power may be adjusted based on the target transmission power corresponding to the target failure rate.

The example embodiments are described above in the case of the CCA threshold, the frequency and/or the number of transmitting messages, and the signal transmit power respectively serving as the adjusted parameter. It should be understood that the present disclosure is not limited to the specific details in the above examples. For example, in the above examples, the intensity of the interference signal in the target area is reflected with the density of the user equipments in the target area, but in fact, the parameter adjusting is performed still based on the intensity of a signal (as the interference source) over the specific spectrum resource in the target area, to achieve the desired communication performance.

In the foregoing embodiments, the target user equipment adjusts the parameter based on the reference information acquired from the base station and the signal intensity sensed by the target user equipment itself. However, in the case that the base station side can acquire the operation state information of user equipments in the target area, including at least one of time information, position information and spectrum resource information, the base station side can determine mutual interference between the user equipments in the target area more accurately, so that the target user equipment can perform parameter adjusting only based on the information provided by the base station side. In this case, the base station side needs to acquire corresponding information from the user equipments. The user equipments may transmit the operation state information to the base station in a real-time manner. In this case, the time when the state information is transmitted also corresponds to the time when the spectrum resource is used. Alternatively, the user equipments may transmit the operation state information to the base station after being covered by a network. In this case, the time information may indicate the time when the spectrum resource is used instead of the time when the state information is transmitted. In addition, the time information may include a time instant at which the spectrum resource is used or a time period during which the spectrum resource is used.

Figure 2:
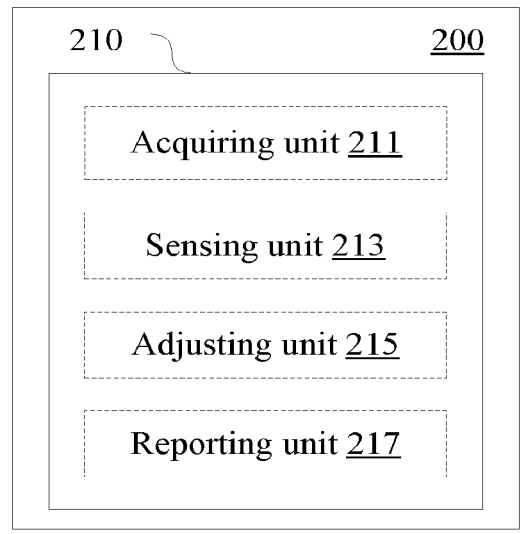
FIG. 2 is a block diagram showing a configuration example of an electronic device for user equipment side according to another embodiment of the present disclosure.

As shown in FIG. 2, an electronic device 200 for user equipment side according to another embodiment includes a processing circuit 210. The processing circuit 210 includes an acquiring unit 211, a sensing unit 213, an adjusting unit 215 and a reporting unit 217. Configurations of the acquiring unit 211, the sensing unit 213 and the adjusting unit 215 are similar to those of the acquiring unit 111, the sensing unit 113 and the adjusting unit 115 described above with reference to FIG. 1, which are omitted herein.

The reporting unit 217 is configured to report operation state information of the user equipment to a serving base station for the user equipment in a case that the user equipment is located in a coverage range of a communication network to which the user equipment belongs. The operation state information includes at least one of time information, position information, and spectrum resource information for the proximity-based service communication. For example, the reported information together with information reported by other user equipments may be used by the base station to determine an signal intensity over a specific spectrum resource in a target area, to be provided to a target user equipment (not necessarily the user equipment corresponding to the electronic device 200) to perform parameter adjusting.

Figure 3:
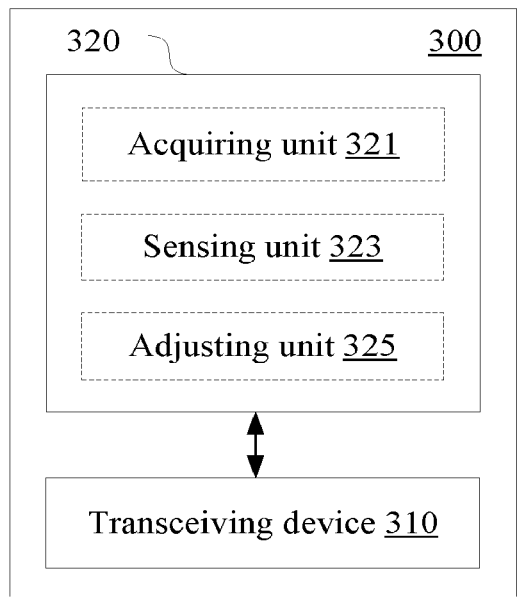
FIG. 3 is a block diagram showing a configuration example of an information processing apparatus for user equipment side according to an embodiment of the present disclosure.

FIG. 3 shows a configuration example of an information processing apparatus for user equipment side according to an embodiment of the present disclosure. The information processing apparatus 300 includes a transceiving device 310 and a processing circuit 320. The processing circuit 320 includes an acquiring unit 321, a sensing unit 323 and an adjusting unit 325.

The acquiring unit 321 is configured to control the transceiving device 310 to acquire reference information of a signal intensity over a specific spectrum resource in a predetermined area from a base station. The sensing unit 323 is configured to control the user equipment to sense the signal intensity over the specific spectrum resource in a case that the user equipment is located in the predetermined area. The adjusting unit 325 is configured to control the user equipment to adjust a parameter for performing proximity-based service communication in the predetermined area based on the reference information and the sensed signal intensity, to achieve a desired communication performance. The parameter affects an admission rate and/or a transmission reliability of the proximity-based service communication.

More detailed configurations of the acquiring unit 321, the sensing unit 323 and the adjusting unit 325 are similar to those of the acquiring unit 111, the sensing unit 113 and the adjusting unit 115 described above with reference to FIG. 1, which are omitted herein.

In the foregoing description of the embodiments of the present disclosure, it is apparent that some processes and methods are also disclosed. Next, an information processing method for user equipment side according to an embodiment of the present disclosure is described without repeating the specific details described above.

Figure 4:
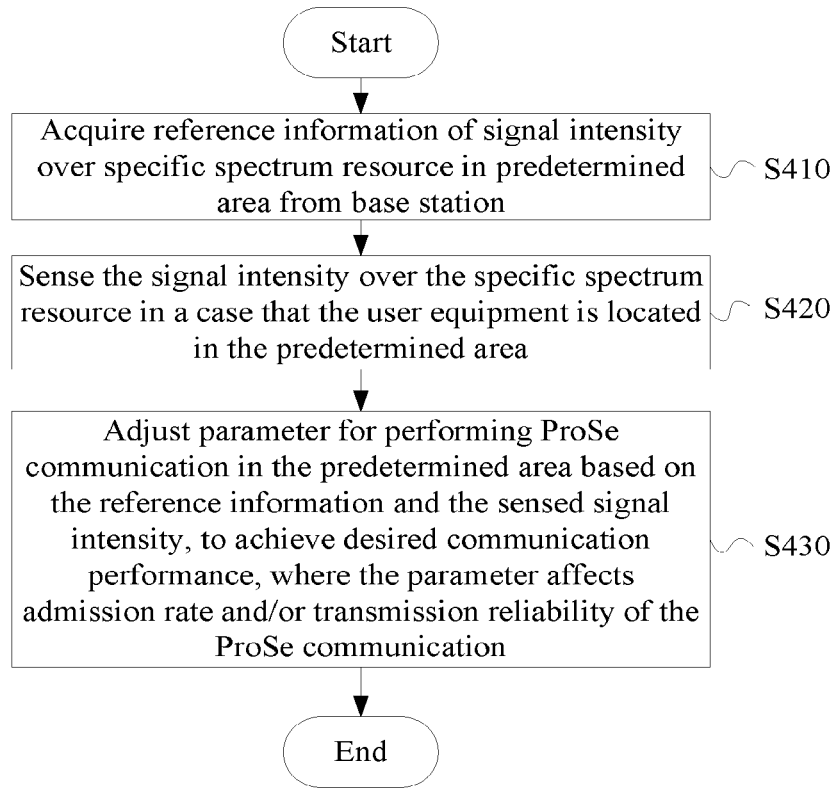
FIG. 4 is a flowchart showing a process example of an information processing method for user equipment side according to an embodiment of the present disclosure.

As shown in FIG. 4, the information processing method for user equipment side according to the embodiment includes the following steps S410 to S430.

In S410, reference information of a signal intensity over a specific spectrum resource in a predetermined area is acquired from a base station.

In S420, in a case that the user equipment is located in the predetermined area, the signal intensity over the specific spectrum resource is sensed.

In S430, a parameter for performing proximity-based service communication in the predetermined area is adjusted based on the reference information and the sensed signal intensity, to achieve a desired communication performance. The parameter affects an admission rate and/or a transmission reliability of the proximity-based service communication.

In addition, a device and method for base station side are further provided in the present disclosure.

Figure 5:
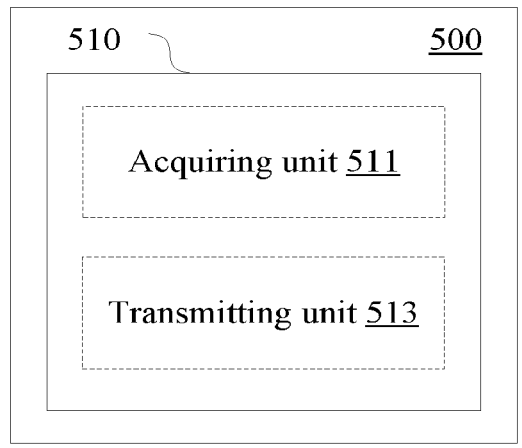
FIG. 5 is a block diagram showing a configuration example of an electronic device for base station side according to an embodiment of the present disclosure.

As shown in FIG. 5, an electronic device 500 for base station side according to an embodiment includes a processing circuit 510. The processing circuit 510 includes an acquiring unit 511 and a transmitting unit 513.

The acquiring unit 511 is configured to control the base station to acquire movement information of a target user equipment.

The transmitting unit 513 is configured to control the base station to transmit reference information of a signal intensity over a specific spectrum resource in a predetermined area and/or a reference value of a parameter for performing proximity-based service communication to the target user equipment, if it is determined based on the movement information that the target user equipment is about to enter the predetermined area.

The predetermined area may be, for example, an area not covered by a communication network to which the target user equipment belongs, so that the target user equipment can autonomously perform parameter adjusting based on the acquired reference information in the case of being not covered by the network. The specific spectrum resource may include, for example, a spectrum resource dedicated to internet of vehicles or a spectrum resource over an unlicensed frequency band. The signal intensity over the specific spectrum resource may reflect a density or the number of other user equipments operating over the specific spectrum resource. In a case that the current user equipment performs proximity-based service communication by using the specific spectrum resource in a target area, the other user equipments serve as interference sources of the proximity-based service communication. The proximity-based service communication may include, for example, MTC, D2D communication, V2X communication, IOT communication, and the like. The parameter for performing the proximity-based service communication in the predetermined area may include, for example, a CCA threshold, a frequency and/or the number of times of transmitting messages, a signal transmission power.

The base station may acquire the reference information in various ways. For example, the base station may estimate the reference information in the predetermined area based on historical data of the entire network. Alternatively, the base station may acquire a position and movement information of the user equipment that the base station serves to obtain the number of vehicles entering in the predetermined area, and then estimates the reference information by using a normal service model. Alternatively, the user equipments may respectively store measurement results in the target area by themselves, and report the measurement results to base stations in a case that a signal exists, and the measurement results may be shared among the base stations, so that the base station at the edge of the predetermined area can determine the reference information based on the measurement results.

In addition, as described above, in the case that the base station side can acquire the position information and spectrum resource information of the user equipments in the target area, the base station side can determine mutual interference between the user equipments in the target area more accurately compared with the case that the base station side determines based on the foregoing reference information, so that the target user equipment can perform the parameter adjusting only based on the information provided by the base station side.

Figure 6:
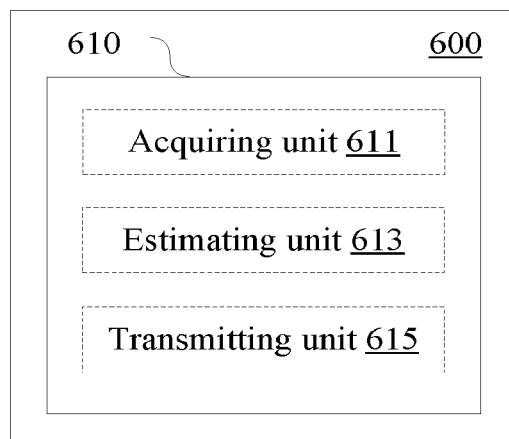
FIG. 6 is a block diagram showing a configuration example of an electronic device for base station side according to another embodiment of the present disclosure.

Accordingly, as shown in FIG. 6, an electronic device 600 for base station side according to an embodiment includes a processing circuit 610. The processing circuit 610 includes an acquiring unit 611, an estimating unit 613 and a transmitting unit 615.

Compared with the acquiring unit 511 described above with reference to FIG. 5, the acquiring unit 611 in this embodiment is further configured to control the base station to acquire operation state information of multiple user equipments from the multiple user equipments. The operation state information includes at least one of time Information, position information, and spectrum resource information for proximity-based service communication.

The estimating unit 613 is configured to estimate a density or the number of other user equipments (other than the target user equipment) operating over a specific spectrum resource in a predetermined area based on the acquired operation state information.

Compared with the transmitting unit 513 described above with reference to FIG. 5, the transmitting unit 615 in this embodiment is further configured to notify the target user equipment of the estimated density or the estimated number of the other user equipments.

Thus, the target user equipment can perform parameter adjusting based on the information provided by the base station side without sensing a signal intensity over the specific spectrum resource.

Next, an example embodiment is described with reference to FIG. 17. In the example, the user equipment is a vehicle, and the proximity-based service communication is V2X communication. It should be understood that some aspects of the example may also be applied in other application scenarios.

Figure 17:
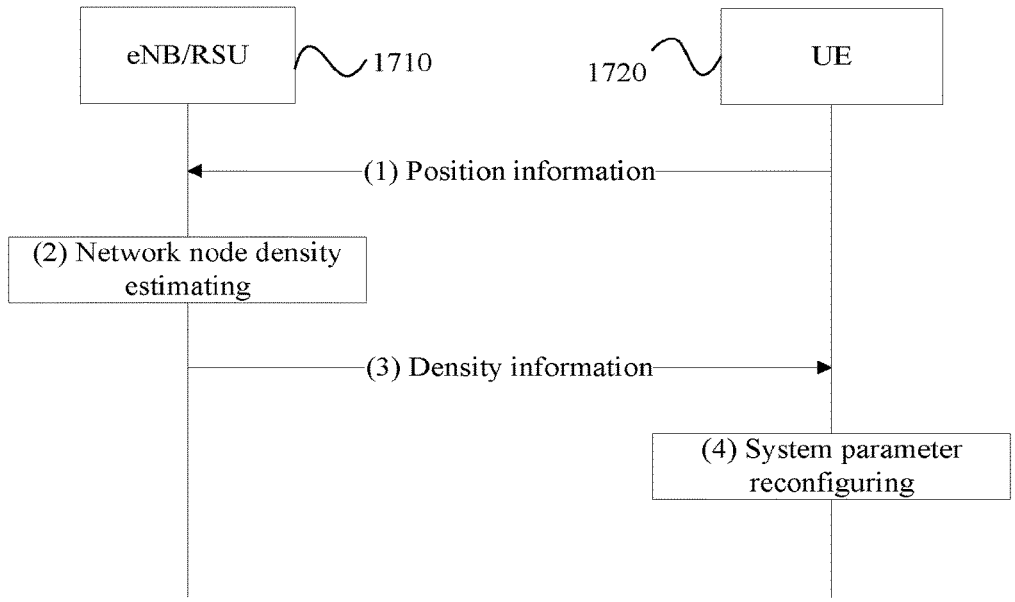
FIG. 17 is a schematic diagram illustrating an example process performed between a base station and a user equipment according to an embodiment.

As shown in FIG. 17, in a process (1), a UE 1720 in a signal coverage range of an eNB/RSU 1710, for example, periodically reports operation state information at least including time information and position information to the eNB/RSU 1710, or the UE 1720 further reports to resource pool information used.

In a process (2), the eNB/RSU 1710 estimates a density of network nodes based on the operation state information, etc. Further, a density of network nodes in each resource pool may be estimated in conjunction with the resource pool information used by the network nodes.

In a process (3), the eNB/RSU 1710 transmits the network node density estimation result and reference information required for adjusting a system parameter (such as a CCA threshold, a message control parameter, and a power control parameter) to the UE 1720.

In a process (4), the UE 1720 adjusts the CCA threshold, the message control parameter or the power control parameter based on the network node density information and the reference information required for system parameter adjusting. The specific parameter adjusting manner may refer to the examples described above.

Figure 7:
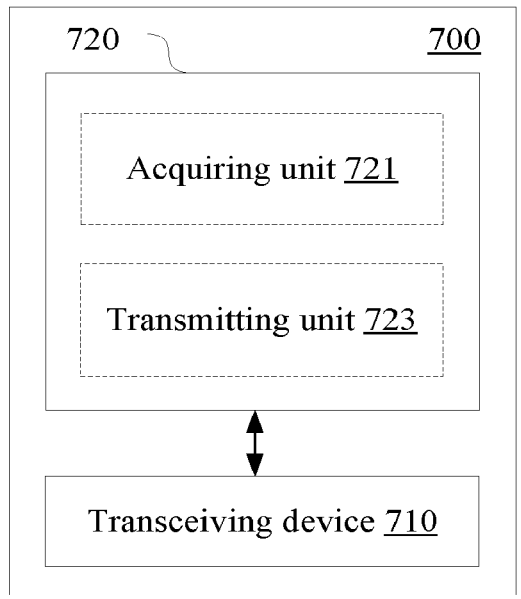
FIG. 7 is a block diagram showing a configuration example of an information processing apparatus for base station side according to an embodiment of the present disclosure.

FIG. 7 shows a configuration example of an information processing apparatus for base station side according to an embodiment. As shown in FIG. 7, an information processing apparatus 700 includes a transceiving device 710 and a processing circuit 720. The processing circuit 720 includes an acquiring unit 721 and a transmitting unit 723. The acquiring unit 721 is configured to control the base station to acquire movement information of a target user equipment. The transmitting unit 723 is configured to control the transceiving apparatus to transmit reference information of a signal intensity over a specific spectrum resource in a predetermined area to the target user equipment, if it is determined based on the movement information that the target user equipment is about to enter the predetermined area.

Figure 8:
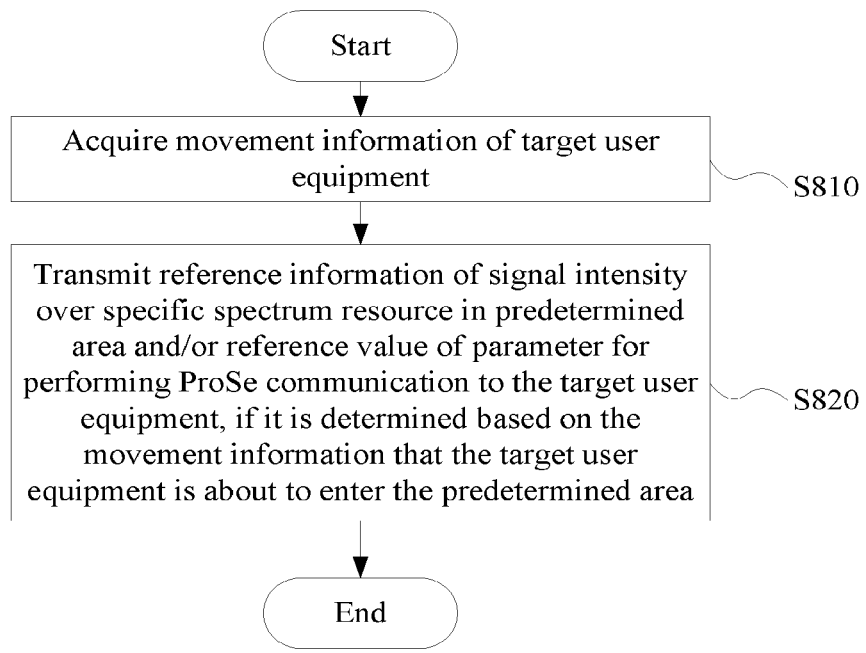
FIG. 8 is a flowchart showing a process example of an information processing method for base station side according to an embodiment of the present disclosure.

FIG. 8 shows an information processing method for base station side according to an embodiment. The method includes the following steps S810 and S820.

In S810, movement information of a target user equipment is acquired.

In S820, if it is determined based on the movement information that the target user equipment is about to enter a predetermined area, reference information of a signal intensity over a specific spectrum resource in the predetermined area and/or a reference value of a parameter for performing proximity-based service communication are transmitted to the target user equipment.

Figure 9:
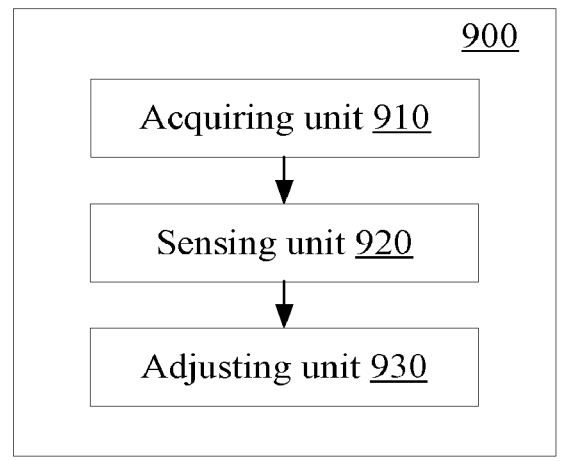
FIG. 9 is a block diagram showing a configuration example of an electronic device for user equipment side according to an embodiment of the present disclosure.

FIG. 9 shows a configuration example of an electronic device for user equipment side according to an embodiment. An electronic device 900 includes an acquiring unit 910, a sensing unit 920 and an adjusting unit 930. The acquiring unit 910 is configured to control the user equipment to acquire reference information of a signal intensity over a specific spectrum resource in a predetermined area from a base station. The sensing unit 920 is configured to control the user equipment to sense the signal intensity over the specific spectrum resource in a case that the user equipment is located in a predetermined area. The adjusting unit 930 is configured to control the user equipment to adjust a parameter for performing proximity-based service communication in the predetermined area based on the reference information and the sensed signal intensity, to achieve a desired communication performance. The parameter affects an admission rate and/or a transmission reliability of the proximity-based service communication.

Figure 10:
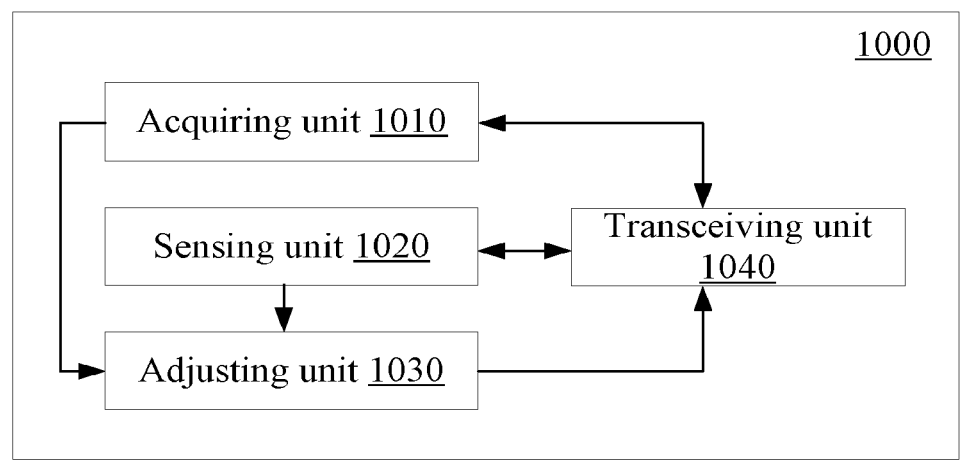
FIG. 10 is a block diagram showing a configuration example of an information processing apparatus for user equipment side according to an embodiment of the present disclosure.

FIG. 10 shows a configuration example of an information processing apparatus for user equipment side according to another embodiment. An information processing apparatus 1000 includes a transceiving unit 1040, an acquiring unit 1010, a sensing unit 1020 and an adjusting unit 1030. The acquiring unit 1010 is configured to control the transceiving unit 1040 to acquire reference information of a signal intensity over a specific spectrum resource in a predetermined area from a base station. The sensing unit 1020 is configured to control the user equipment to sense the signal intensity over the specific spectrum resource in a case that the user equipment is located in the predetermined area. The adjusting unit 1030 is configured to control the user equipment to adjust a parameter for performing proximity-based service communication in the predetermined area based on the reference information and the sensed signal intensity, to achieve a desired communication performance. The parameter affects an admission rate and/or a transmission reliability of the proximity-based service communication.

Figure 11:
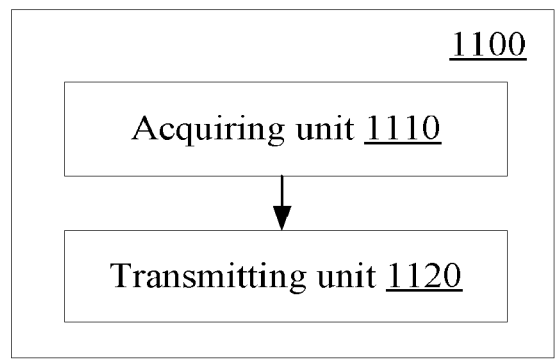
FIG. 11 is a block diagram showing a configuration example of an electronic device for base station side according to an embodiment of the present disclosure.

FIG. 11 shows an electronic device for base station side according to another embodiment. An electronic device 1100 includes an acquiring unit 1110 and a transmitting unit 1120. The acquiring unit 1110 is configured to control the base station to acquire movement information of a target user equipment. The transmitting unit 1120 is configured to control the base station to transmit reference information of a signal intensity over a specific spectrum resource in a predetermined area and/or a reference value of a parameter for performing proximity-based service communication to the target user equipment, if it is determined based on the movement information that the target user equipment is about to enter the predetermined area.

Figure 12:
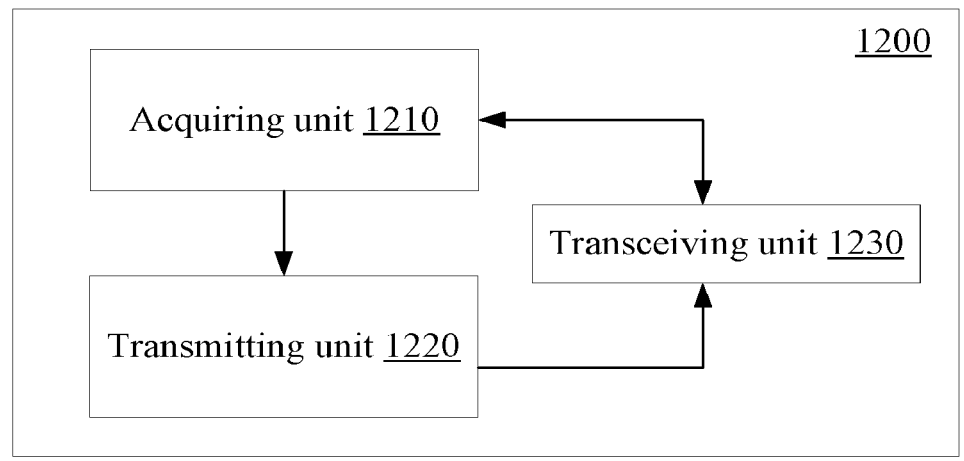
FIG. 12 is a block diagram showing a configuration example of an information processing apparatus for base station side according to an embodiment of the present disclosure.

FIG. 12 shows an information processing apparatus for base station side according to another embodiment. An information processing apparatus 1200 includes a transceiving unit 1230, an acquiring unit 1210 and a transmitting unit 1220. The acquiring unit 1210 is configured to control the base station to acquire movement information of a target user equipment. The transmitting unit 1220 is configured to control the transceiving device to transmit reference information of a signal intensity over a specific spectrum resource in a predetermined area and/or a reference value of a parameter for performing proximity-based service communication to the target user equipment, if it is determined based on the movement information that the target user equipment is about to enter the predetermined area.

As an example, steps of the above-described method and composing modules and/or units of the above-described device may be implemented as software, firmware, hardware, or a combination thereof. In a case of implementing by software or firmware, a program constituting the software for implementing the above-described method may be installed from a storage medium or a network to a computer (for example, a general-purpose computer 2000 shown in FIG. 18) having a dedicated hardware structure. The computer can perform various functions when being installed with various programs.

Figure 18:
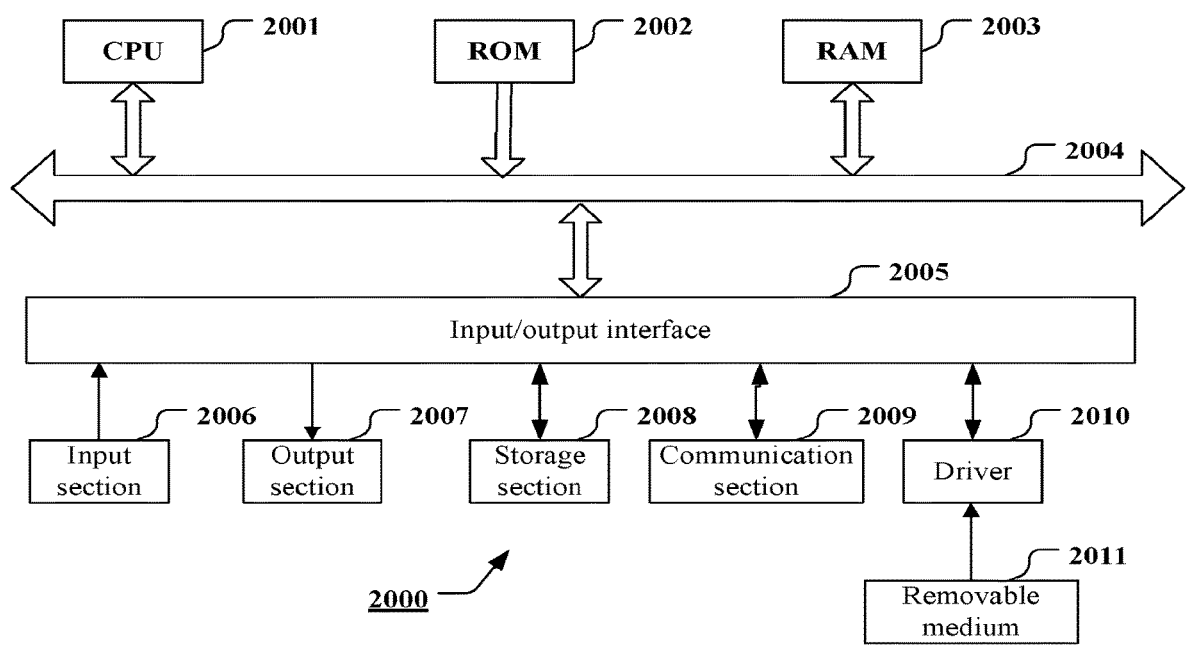
FIG. 18 is a block diagram of an exemplary structure of a computer for implementing the method and the device according to the present disclosure.

In FIG. 18, an arithmetic processing unit (i.e., a CPU) 2001 performs various types of processing according to programs stored in a read only memory (ROM) 2002 or programs loaded from a storage section 2008 to a random access memory (RAM) 2003. Data required when the CPU 2001 performs various types of processing is stored in the RAM 2003 as needed. The CPU 2001, the ROM 2002 and the RAM 2003 are linked to each other via a bus 2004. An input/output interface 2005 is also linked to the bus 2004.

The following components are linked to the input/output interface 2005: an input section 2006 (including a keyboard, a mouse or the like), an output section 2007 (including a display such as a cathode ray tube (CRT), a liquid crystal display (LCD), a speaker or the like), a storage section 2008 (including a hard disk or the like), and a communication section 2009 (including a network interface card such as a LAN card, a modem or the like). The communication section 2009 performs communication processing via a network such as the Internet. A driver 2010 may also be linked to the input/output interface 2005 as needed. A removable medium 2011 such as a magnetic disk, an optical disk, a magneto-optical disk and a semiconductor memory may be installed on the driver 2010 as needed, such that the computer programs read from the removable medium 2011 are installed in the storage section 2008 as needed.

In a case that the series of processing described above is implemented by software, programs constituting the software are installed from a network such as the Internet or a storage medium such as the removable medium 2011.

Those skilled in the art should understand that the storage medium is not limited to the removable medium 2011 shown in FIG. 18 in which programs are stored and which is distributed separately from the apparatus to provide the programs to the user. An example of the removable medium 2011 includes: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively, the storage medium may be the ROM 2002, a hard disk included in the storage section 2008 or the like. The programs are stored in the storage medium, and the storage medium is distributed to the user together with the device including the storage medium.

According to an embodiment of the present disclosure, a program product storing machine-readable instruction codes is further provided. When read and executed by a machine, the instruction codes cause the machine to perform the above-described method according to the embodiment of the present disclosure.

Accordingly, a storage medium for carrying the above-described program product storing the machine-readable instruction codes is also included in the present disclosure. The storage medium includes, but not limited to, a floppy disk, an optical disk, a magneto-optical disk, a storage card, a memory stick or the like.

The embodiments of the present disclosure further relate to an electronic device in the following. In a case that the electronic device is for base station side, the electronic device may be implemented as any type of evolution Node B (eNB), such as a macro eNB and a small eNB. The small eNB may be an eNB covering a cell smaller than a macro cell, such as a pico eNB, a micro eNB or a home (femto) eNB. Alternatively, the base station may be implemented as any other type of base station, such as a NodeB and a base transceiver station (BTS). The electronic device may include: a main body (also referred to as a base station apparatus) configured to control wireless communication; and one or more remote radio heads (RRH) arranged at positions different from the main body. In addition, various types of terminals described below may operate as a base station by performing functions of the base station temporarily or in a semi-persistent manner.

In a case that the electronic device is for user equipment side, the electronic device may be implemented as mobile terminals (such as a smart phone, a tablet personal computer (PC), a notebook PC, a portable game terminal, a portable/dongle mobile router and a digital camera) or a vehicle terminal (such as a car navigation apparatus). In addition, the electronic device may be a wireless communication module (such as an integrated circuit module including one or more chips) installed on each of the above terminals.

[Application Example on Terminal Device]

Figure 19:
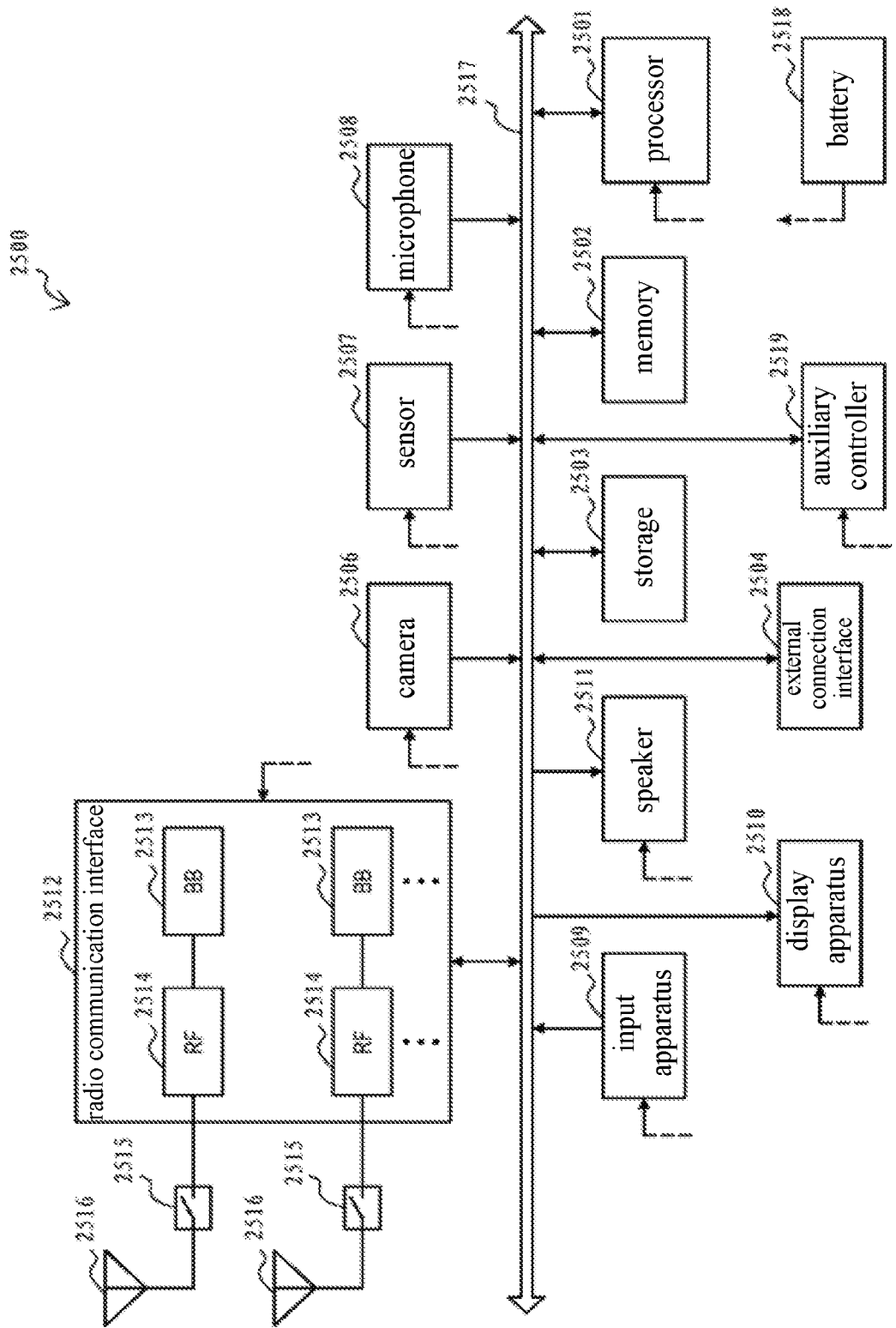
FIG. 19 is a block diagram showing a schematic configuration example of a smart phone to which the technology of the present disclosure may be applied.

FIG. 19 is a block diagram showing a schematic configuration example of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program executed by the processor 2501 and data. The storage 2503 may include a storage medium such as a semiconductor memory and a hard disk. The external connection interface 2504 is an interface for connecting an external apparatus (such as a memory card and a universal serial bus (USB) apparatus) to the smart phone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 to audio signals. The input apparatus 2509 includes, for example, a touch sensor configured to detect touch onto a screen of the display apparatus 2510, a keypad, a keyboard, a button, or a switch, and receive an operation or information inputted from a user. The display apparatus 2510 includes a screen (such as a liquid crystal display (LCD) and an organic light-emitting diode (OLED) display), and displays an output image of the smart phone 2500. The speaker 2511 converts audio signals that are outputted from the smart phone 2500 to sounds.

The radio communication interface 2512 supports any cellular communication scheme (such as LTE and LTE-Advanced), and performs wireless communication. The radio communication interface 2512 may typically include, for example, a base band (BB) processor 2513 and a radio frequency (RF) circuit 2514. The BB processor 2513 may perform, for example, encoding/decoding, modulating/demodulating, and multiplexing/demultiplexing, and performs various types of signal processing for wireless communication. Meanwhile, the RF circuit 2514 may include, for example, a mixer, a filter, and an amplifier, and transmits and receives wireless signals via the antenna 2516. The radio communication interface 2512 may be a chip module having the BB processor 2513 and the RF circuit 2514 integrated thereon. As shown in FIG. 19, the radio communication interface 2512 may include multiple BB processors 2513 and multiple RF circuits 2514. Although FIG. 19 shows the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of wireless communication scheme such as a short-distance wireless communication scheme, a near field communication scheme, and a wireless local area network (LAN) scheme. In this case, the radio communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the radio communication interface 2512.

Figure 21:
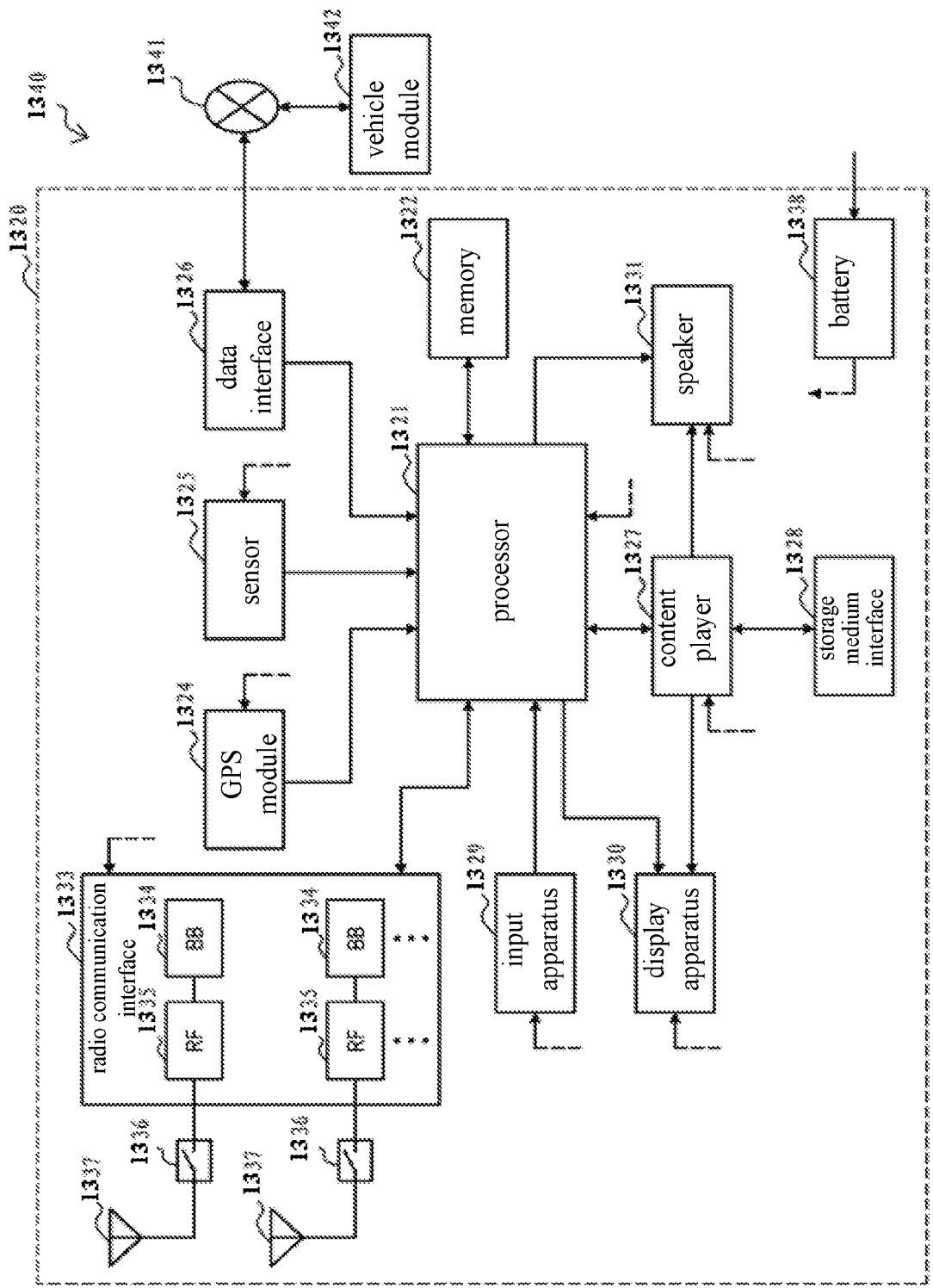
FIG. 21 is a block diagram showing a schematic configuration example of a car navigation apparatus to which the technology of the present disclosure may be applied.

Each of the antennas 2516 includes a single or multiple antenna elements (such as multiple antenna elements included in an MIMO antenna), and is used for the radio communication interface 2512 to transmit and receive wireless signals. As shown in FIG. 19, the smart phone 2500 may include the multiple antennas 2516. Although FIG. 21 shows the example in which the smart phone 2500 includes the multiple antennas 2516, the smart phone 2500 may also include a single antenna 2516.

Furthermore, the smart phone 2500 may include the antenna 2516 for each wireless communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smart phone 2500 shown in FIG. 10 via feeder lines that are partially shown as dashed lines in the FIG. 19. The auxiliary controller 2519 operates a minimum necessary function of the smart phone 2500, for example, in a sleep mode.

In the smart phone 2500 shown in FIG. 19, the transceiving device or the transceiving unit in the information processing apparatus for user equipment side according to the embodiment of the present disclosure may be implemented by the radio communication interface 2512. At least part of functions of the processing circuit and/or the units in the electronic device or the information processing apparatus for user equipment side according to the embodiment of the present disclosure may also be implemented by the processor 2501 or the auxiliary controller 2519. For example, the power consumption of the battery 2518 may be reduced by the auxiliary controller 2519 performing part of the functions of the processor 2501. In addition, the processor 2501 or the auxiliary controller 2519 may execute at least part of the functions of the processing circuit and/or the units in the electronic device or the information processing apparatus for user equipment side according to the embodiment of the present disclosure by executing the programs stored in the memory 2502 or the storage 2503.

[Application Example on Base Station]

Figure 20:
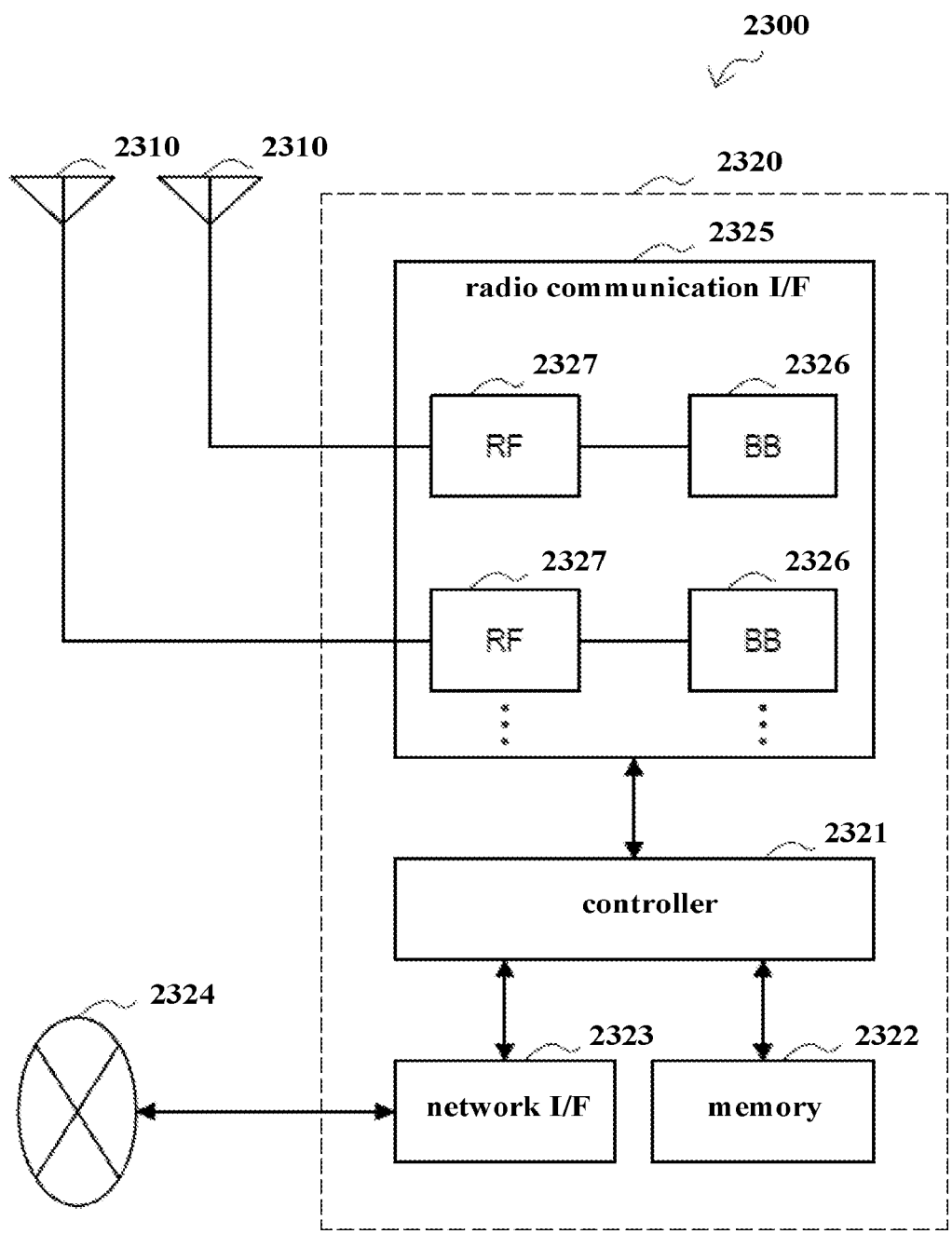
FIG. 20 is a block diagram showing a schematic configuration example of an evolution node base station (eNB) to which the technology of the present disclosure may be applied.

FIG. 20 is a block diagram showing a schematic configuration example of an eNB to which the technology of the present disclosure may be applied. An eNB 2300 includes one or more antennas 2310 and a base station apparatus 2320. The base station apparatus 2320 and each antenna 2310 may be connected to each other via an RF cable.

Each of the antennas 2310 includes a single or multiple antenna elements (such as multiple antenna elements included in a multi-input multi-output (MIMO) antenna), and is used for the base station apparatus 2320 to transmit and receive wireless signals. As shown in FIG. 20, the eNB 2300 may include the multiple antennas 2310. For example, the multiple antennas 2310 may be compatible with multiple frequency bands used by the eNB 2300. Although FIG. 20 shows the example in which the eNB 2300 includes the multiple antennas 2310, the eNB 2300 may also include a single antenna 2310.

The base station apparatus 2320 includes a controller 2321, a memory 2322, a network interface 2323, and a radio communication interface 2325.

The controller 2321 may be, for example, a CPU or a DSP, and operates various functions of a higher layer of the base station apparatus 2320. For example, the controller 2321 generates a data packet from data in signals processed by the radio communication interface 2325, and transfers the generated packet via the network interface 2323. The controller 2321 may bundle data from multiple base band processors to generate the bundled packet, and transfer the generated bundled packet. The controller 2321 may have logical functions of performing control such as radio resource control, radio bearer control, mobility management, admission control and scheduling. The control may be performed in corporation with an eNB or a core network node in the vicinity. The memory 2322 includes a RAM and a ROM, and stores a program executed by the controller 2321, and various types of control data (such as a terminal list, transmission power data, and scheduling data).

The network interface 2323 is a communication interface for connecting the base station apparatus 2320 to a core network 2324. The controller 2321 may communicate with a core network node or another eNB via the network interface 2323. In this case, the eNB 2300, and the core network node or the other eNB may be connected to each other via a logical interface (such as an S1 interface and an X2 interface). The network interface 2323 may also be a wired communication interface or a radio communication interface for wireless backhaul. If the network interface 2323 is a radio communication interface, the network interface 2323 may use a higher frequency band for wireless communication than a frequency band used by the radio communication interface 2325.

The radio communication interface 2325 supports any cellular communication scheme (such as Long Term Evolution (LTE) and LTE-Advanced), and provides wireless connection to a terminal positioned in a cell of the eNB 2300 via the antenna 2310. The radio communication interface 2325 may typically include, for example, a BB processor 2326 and an RF circuit 2327. The BB processor 2326 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 2326 may have a part or all of the above-described logical functions instead of the controller 2321. The BB processor 2326 may be a memory that stores a communication control program, or a module that includes a processor and a related circuit configured to execute the program. Updating the program may allow the functions of the BB processor 2326 to be changed. The module may be a card or a blade that is inserted into a slot of the base station apparatus 2320. Alternatively, the module may also be a chip that is mounted on the card or the blade. Meanwhile, the RF circuit 2327 may include, for example, a mixer, a filter, and an amplifier, and transmits and receives wireless signals via the antenna 2310.

As shown in FIG. 20, the radio communication interface 2325 may include the multiple BB processors 2326. For example, the multiple BB processors 2326 may be compatible with multiple frequency bands used by the eNB 2300. As shown in FIG. 20, the radio communication interface 2325 may include the multiple RF circuits 2327. For example, the multiple RF circuits 2327 may be compatible with multiple antenna elements. Although FIG. 20 shows the example in which the radio communication interface 2325 includes the multiple BB processors 2326 and the multiple RF circuits 2327, the radio communication interface 2325 may also include a single BB processor 2326 or a single RF circuit 2327.

In the eNB 2300 shown in FIG. 20, the transceiving device or the transceiving unit in the information processing apparatus for base station side according to the embodiment of the present disclosure may be implemented by the radio communication interface 2325. At least part of functions of the processing circuit and/or the units in the electronic device or the information processing apparatus for base station side according to the embodiment of the present disclosure may also be implemented by the controller 2321. For example, the controller 2321 may execute at least part of the functions of the processing circuit and/or the units in the electronic device or the information processing apparatus for base station side according to the embodiment of the present disclosure by executing the programs stored in the memory 2322.

[Application Example on Car Navigation Apparatus]

FIG. 21 is a block diagram showing a schematic configuration example of a car navigation apparatus 2120 to which the technology of the present disclosure may be applied. The car navigation apparatus 2120 includes a processor 2121, a memory 2122, a global positioning system (GPS) module 2124, a sensor 2125, a data interface 2126, a content player 2127, a storage medium interface 2128, an input apparatus 2129, a display apparatus 2130, a speaker 2131, a radio communication interface 2133, one or more antenna switches 2136, one or more antennas 2137, and a battery 2138.

The processor 2121 may be, for example, a CPU or a SoC, and controls a navigation function and another function of the car navigation apparatus 2120. The memory 2122 includes a RAM and a ROM, and stores a program executed by the processor 2121 and data.

The GPS module 2124 determines a position (such as latitude, longitude, and altitude) of the car navigation apparatus 2120 by using GPS signals received from a GPS satellite. The sensor 2125 may include a group of sensors such as a gyro sensor, a geomagnetic sensor, and an air pressure sensor. The data interface 2126 is connected to, for example, an in-vehicle network 2141 via a terminal that is not shown, and acquires data (such as vehicle speed data) generated by the vehicle.

The content player 2127 reproduces content stored in a storage medium (such as a CD and a DVD) that is inserted into the storage medium interface 2128. The input apparatus 2129 includes, for example, a touch sensor configured to detect touch onto a screen of the display apparatus 2130, a button or a switch, and receives an operation or information inputted from a user. The display apparatus 2130 includes a screen such as a LCD or an OLED display, and displays an image of the navigation function or content that is reproduced. The speaker 2131 outputs sounds of the navigation function or the content that is reproduced.

The radio communication interface 2133 supports any cellular communication scheme (such as LTE and LTE-Advanced), and performs wireless communication. The radio communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for wireless communication. Meanwhile, the RF circuit 2135 may include, for example, a mixer, a filter, and an amplifier, and transmits and receives wireless signals via the antenna 2137. The radio communication interface 2133 may also be a chip module having the BB processor 2134 and the RF circuit 2135 integrated thereon. As shown in FIG. 21, the radio communication interface 2133 may include the multiple BB processors 2134 and the multiple RF circuits 2135. Although FIG. 21 shows the example in which the radio communication interface 2133 includes the multiple BB processors 2134 and the multiple RF circuits 2135, the radio communication interface 2133 may also include a single BB processor 2134 or a single RF circuit 2135.

Furthermore, in addition to the cellular communication scheme, the radio communication interface 2133 may support another type of wireless communication scheme such as a short-distance wireless communication scheme, a near field communication scheme, and a wireless LAN scheme. In this case, the radio communication interface 2133 may include the BB processor 2134 and the RF circuit 2135 for each wireless communication scheme.

Each of the antenna switches 2136 switches connection destinations of the antennas 2137 among multiple circuits (such as circuits for different wireless communication schemes) included in the radio communication interface 2133.

Each of the antennas 2137 includes a single or multiple antenna elements (such as multiple antenna elements included in an MIMO antenna), and is used for the radio communication interface 2133 to transmit and receive wireless signals. As shown in FIG. 21, the car navigation apparatus 2120 may include the multiple antennas 2137. Although FIG. 21 shows the example in which the car navigation apparatus 2120 includes the multiple antennas 2137, the car navigation apparatus 2120 may also include a single antenna 2137.

Furthermore, the car navigation apparatus 2120 may include the antenna 2137 for each wireless communication scheme. In this case, the antenna switches 2136 may be omitted from the configuration of the car navigation apparatus 2120.

The battery 2138 supplies power to blocks of the car navigation apparatus 2120 shown in FIG. 21 via feeder lines that are partially shown as dashed lines in the FIG. 21. The battery 2138 accumulates power supplied form the vehicle.

In the car navigation apparatus 2120 shown in FIG. 21, the transceiving device or the transceiving unit in the information processing apparatus for user equipment side according to the embodiment of the present disclosure may be implemented by the radio communication interface 2133. At least part of functions of the processing circuit and/or the units in the electronic device or the information processing apparatus for user equipment side according to the embodiment of the present disclosure may also be implemented by the processor 2121.

The technology of the present disclosure may also be implemented as an in-vehicle system (or a vehicle) 2140 including one or more blocks of the car navigation apparatus 2120, the in-vehicle network 2141 and a vehicle module 2142. The vehicle module 2142 generates vehicle data (such as a vehicle speed, an engine speed or failure information), and outputs the generated data to the in-vehicle network 2141.

In the above description of specific embodiments of the present disclosure, the features described and/or illustrated with respect to one embodiment may be used in one or more other embodiments in the same or similar manner, may be combined with features in other embodiments, or may replace features in other embodiments.

It should be noted that the term "comprising/including" as used herein refers to the presence of a feature, element, step, or component, but does not exclude the presence or addition of one or more other features, elements, steps or components.

In the above embodiments and examples, reference numerals consist of numerals are used to represent steps and/or units. It should be understood by those skill in the art that the reference numerals are used only for facilitating description and illustration and are not intended to represent an order or limit in any other manner.

In addition, the method of the present disclosure is not limited to be performed in a chronological order described in the specification, but may also be performed in other chronological order, in parallel or independently. Therefore, the order for executing the method described in this specification does not limit the technical scope of the present disclosure.

Although the present disclosure has been described by specific embodiments according to the present disclosure, it should be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents shall be construed as being included within the scope of protection of the present disclosure.

The invention claimed is:

1. An electronic device for user equipment, the electronic device comprising:
    a processing circuit configured to:
        control the user equipment to acquire, from a base station, reference information of a signal intensity over a specific spectrum resource in a predetermined area;
        control the user equipment to sense the signal intensity over the specific spectrum resource in a case that the user equipment is located in the predetermined area; and
        control the user equipment to adjust, based on the reference information and the sensed signal intensity, a parameter for performing proximity-based service communication in the predetermined area, to achieve a desired communication performance, wherein
    the parameter affects an admission rate and/or a transmission reliability of the proximity-based service communication.

2. The electronic device according to claim 1, wherein the reference information comprises a maximum signal intensity that is tolerable by the user equipment in a case that the user equipment operates with a current reference value of the parameter and a predetermined admission rate and/or transmission reliability of the proximity-based service communication over the specific spectrum resource is met.

3. The electronic device according to claim 1, wherein the predetermined area is an area not covered by a communication network to which the user equipment belongs.

4. The electronic device according to claim 1, wherein the signal intensity over the specific spectrum resource reflects a density or the number of other user equipments operating over the specific spectrum resource, the other user equipments serving as interference sources of the proximity-based service communication.

5. The electronic device according to claim 1, wherein the parameter comprises one or more of:
    a clear channel assessment threshold for accessing the specific spectrum resource;
    a frequency and/or the number of times of transmitting messages by using the proximity-based service communication; and
    a signal transmission power of the proximity-based service communication.

6. The electronic device according to claim 1, wherein the adjusting comprises adjusting the parameter in a predetermined range.

7. The electronic device according to claim 1, wherein the adjusting comprises: adjusting the parameter with an offset obtained based on the reference information and the sensed signal intensity.

8. The electronic device according to claim 1, wherein the adjusting comprises adjusting the parameter based on a service priority of the proximity-based service communication, such that the admission rate and/or transmission reliability of a high priority service reaches a predetermined level.

9. The electronic device according to claim 1, wherein the specific spectrum resource comprises a spectrum resource dedicated to vehicles communication and a spectrum esource over an unlicensed frequency band.

10. The electronic. device. acccording to claim 1, wherein the processing circuit is further configured to control the user equipment to acquire a reference of the parameter from the base station.

11. The electronic device according to claim 10, wherein the reference value of the parameter is set individually for different resource pools.

12. The electronic device according to claim 1, wherein the processing circuit is configured to control the user equipment to perform the sensing and the adjusting, periodically or in a case that a predetermined triggering condition is met.

13. The electronic device according to claim 12, wherein the predetermined triggering condition comprises a condition that no spectrum resource for the proximity-based service communication is found in a preset time period.

14. The electronic device according to claim 1, wherein the processing circuit is further configured to:
    report, to a serving base for the user equipmeent, operation state information of the user equipment when being located in the predetermined area, in a case that the user equipment is located in a coverage range of a communication network to which the user equipment belongs, the operation state information comprising at least one of time information, position information, and spectrum resource information for the proximity-based service communication.

15. The electronic device according to claim 14, wherein the time information comprises a time period during which the spectrum resource is used by the user equipment.

16. The electronic device according to claim 1, wherein the proximity-based service communication comprises machine type communication MTC, device-to-device D2D communication, vehicle-to-everything V2X communication, internet of things IOT communication.

17. An information processing method for user equipment, the information processing method comprising:
    acquiring, by the user equipment from a base station, reference information of a signal intensity over a specific spectrum resource in a predetermined area;
    sensing the signal intensity over the specific spectrum resource; and
    configuring or reconfiguring, based on the reference information and the sensed signal intensity, a parameter for performing proximity-based service communication in the predetermined area, to achieve a desired communication performance, wherein
    the parameter affects an admission rate and/or a transmission reliability of the proximity-based service communication.

18. The information processing method to claim 17, wherein the reference information comprises a maximum signal intensity that is tolerable by the user equipment in a case that the user equipment operates with a current reference value of the parameter and a predetermined admission rate and/or transmission reliability of the proximity-based service communication over the specific spectrum resource is met.

19. The information processing method to claim 17, wherein the predetermined area is an area not covered by a communication network to which the user equipment belongs.

20. The information processing method to claim 17, wherein the signal intensity over the specific spectrum resource reflects a density or the number of other user equipments operating over the specific spectrum resource, the other user equipments serving as interference sources of the proximity-based service communication.

* * * * *